United States Patent
Svendsen et al.

(10) Patent No.: US 12,254,901 B2
(45) Date of Patent: *Mar. 18, 2025

(54) LOW BANDWIDTH CONSUMPTION ONLINE CONTENT EDITING

(71) Applicant: WEVIDEO, INC., Sunnyvale, CA (US)

(72) Inventors: Jostein Svendsen, Saratoga, CA (US); Bjorn Rustberggaard, Nesoya (NO)

(73) Assignee: WEVIDEO, INC., Lake Forest, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/460,547

(22) Filed: Aug. 30, 2021

(65) Prior Publication Data
US 2022/0084557 A1    Mar. 17, 2022

Related U.S. Application Data

(63) Continuation of application No. 16/168,780, filed on Oct. 23, 2018, now Pat. No. 11,127,431, which is a
(Continued)

(51) Int. Cl.
*G06F 16/70*     (2019.01)
*G11B 27/031*    (2006.01)
(Continued)

(52) U.S. Cl.
CPC ............ *G11B 27/031* (2013.01); *G06F 16/70* (2019.01); *H04N 5/76* (2013.01); *H04N 21/222* (2013.01);
(Continued)

(58) Field of Classification Search
CPC .. H04N 21/222; H04N 5/76; H04N 21/47205; H04N 21/233; H04N 21/25435;
(Continued)

(56) References Cited

U.S. PATENT DOCUMENTS 4,932,054 A    6/1990  Chou et al.
4,977,594 A    12/1990 Shear
(Continued)

FOREIGN PATENT DOCUMENTS

EP    2068251 A2    6/2009
GB    2464948 A  *  5/2010  ........... G06Q 10/107

OTHER PUBLICATIONS

Apple Inc., "Final Cut Pro 7 User Manual," pp. 1-2, 1553-1583, 1995-2030, (2010).
(Continued)

*Primary Examiner* — Thai Q Tran
*Assistant Examiner* — Nienru Yang
(74) *Attorney, Agent, or Firm* — Ahmann Kloke LLP

(57) ABSTRACT

Various embodiments of the invention provide systems and methods for low bandwidth consumption online content editing, where user-created content comprising high definition/quality content is created or modified at an online content editing server according to instructions from an online content editor client, and where a proxy version of the resulting user-created content is provided to online content editor client to facilitate review or further editing of the user-created content from the online content editor client. In some embodiments, the online content editing server utilizes proxy content during creation and modification operations on the user-created content, and replaces such proxy content with corresponding higher definition/quality content, possibly when the user-created content is published for consumption, or when the user has paid for the higher quality content.

19 Claims, 7 Drawing Sheets

Related U.S. Application Data continuation of application No. 15/342,364, filed on Nov. 3, 2016, now Pat. No. 10,109,318, which is a continuation of application No. 14/874,311, filed on Oct. 2, 2015, now Pat. No. 9,489,983, which is a continuation of application No. 13/433,256, filed on Mar. 28, 2012, now abandoned.

(60) Provisional application No. 61/564,261, filed on Nov. 28, 2011, provisional application No. 61/564,257, filed on Nov. 28, 2011, provisional application No. 61/564,256, filed on Nov. 28, 2011, provisional application No. 61/468,725, filed on Mar. 29, 2011.

(51) Int. Cl.
| | | |
|---|---|---|
| *H04N 5/76* | (2006.01) | |
| *H04N 21/222* | (2011.01) | |
| *H04N 21/233* | (2011.01) | |
| *H04N 21/234* | (2011.01) | |
| *H04N 21/254* | (2011.01) | |
| *H04N 21/2543* | (2011.01) | |
| *H04N 21/472* | (2011.01) | |

(52) U.S. Cl.
CPC ..... *H04N 21/233* (2013.01); *H04N 21/23424* (2013.01); *H04N 21/2541* (2013.01); *H04N 21/25435* (2013.01); *H04N 21/47205* (2013.01)

(58) Field of Classification Search
CPC .......... H04N 21/23424; H04N 21/2541; G06F 16/70; G11B 27/031
USPC ......................................................... 386/285
See application file for complete search history.

(56) References Cited

U.S. PATENT DOCUMENTS

| | | |
|---|---|---|
| 5,247,575 A | 9/1993 | Sprague et al. |
| 5,841,512 A | 11/1998 | Goodhill |
| 6,351,765 B1 | 2/2002 | Pietropaolo et al. |
| 6,388,668 B1 | 5/2002 | Elliott |
| 6,442,283 B1 | 8/2002 | Tewfik et al. |
| 6,546,188 B1 | 4/2003 | Ishii et al. |
| 7,120,859 B2 | 10/2006 | Wettach |
| 7,213,051 B2 | 5/2007 | Zhu et al. |
| 7,375,768 B2 | 5/2008 | Herberger et al. |
| 7,437,673 B2 | 10/2008 | Hyman et al. |
| 7,587,509 B1 | 9/2009 | Edelman et al. |
| 7,594,039 B2 | 9/2009 | Shima |
| 7,617,278 B1 | 11/2009 | Edelman et al. |
| 7,660,416 B1 | 2/2010 | Kline |
| 7,769,819 B2 | 8/2010 | Lerman et al. |
| 7,809,802 B2 | 10/2010 | Lerman et al. |
| 7,840,661 B2 | 11/2010 | Kalaboukis et al. |
| 7,934,011 B2 | 4/2011 | Gavin et al. |
| 7,945,615 B1 | 5/2011 | Shetty et al. |
| 7,945,916 B1 | 5/2011 | Lozben et al. |
| 8,051,287 B2 | 11/2011 | Shetty et al. |
| 8,136,127 B1 | 3/2012 | Lozben et al. |
| 8,156,176 B2 | 4/2012 | Lerman et al. |
| 8,161,159 B1 | 4/2012 | Shetty et al. |
| 8,166,191 B1 | 4/2012 | Swaminathan et al. |
| 8,176,115 B2 | 5/2012 | Eves et al. |
| 8,205,154 B2 | 6/2012 | Doepke et al. |
| 8,209,611 B2 | 6/2012 | Yoshimine |
| 8,209,618 B2 | 6/2012 | Garofalo |
| 8,218,830 B2 | 7/2012 | Gavin et al. |
| 8,225,228 B2 | 7/2012 | Marinkovich et al. |
| 8,245,188 B2 | 8/2012 | Hertenstein |
| 8,265,457 B2 | 9/2012 | Baum et al. |
| 8,270,815 B2 | 9/2012 | Yen et al. |
| 8,286,069 B2 | 10/2012 | Gavin et al. |
| 8,302,008 B2 | 10/2012 | Hertenstein |
| 8,331,735 B2 | 12/2012 | Lee et al. |
| 8,341,525 B1 | 12/2012 | Achour et al. |
| 8,411,758 B2 | 4/2013 | Folgner et al. |
| 8,412,841 B1 | 4/2013 | Swaminathan et al. |
| 8,422,852 B2 | 4/2013 | Suri et al. |
| 8,433,611 B2 | 4/2013 | Lax et al. |
| 8,451,276 B2 | 5/2013 | Jung |
| 8,495,092 B2 | 7/2013 | Piccionelli et al. |
| 8,510,441 B2 | 8/2013 | Ooi et al. |
| 8,532,469 B2 | 9/2013 | Fiumi |
| 8,554,734 B1 | 10/2013 | Chatterjee et al. |
| 8,577,204 B2 | 11/2013 | Lin et al. |
| 8,639,086 B2 | 1/2014 | Chen et al. |
| 8,667,016 B2 | 3/2014 | Sims et al. |
| 8,667,532 B2 | 3/2014 | Heath |
| 8,695,031 B2 | 4/2014 | Kumar et al. |
| 8,719,865 B2 | 5/2014 | Moonka et al. |
| 8,749,618 B2 | 6/2014 | Fiumi |
| 8,788,941 B2 | 7/2014 | Hedges |
| 8,806,346 B2 | 8/2014 | Hedges |
| 8,812,672 B2 | 8/2014 | Ramaley et al. |
| 8,831,999 B2 | 9/2014 | Bolton et al. |
| 8,868,465 B2 | 10/2014 | Folgner et al. |
| 8,910,045 B2 | 12/2014 | Baum |
| 8,935,236 B2 | 1/2015 | Morita et al. |
| 8,935,611 B2 | 1/2015 | Oberbrunner et al. |
| 8,966,402 B2 | 2/2015 | Lu et al. |
| 8,984,406 B2 | 3/2015 | Pueyo et al. |
| 9,009,581 B2 | 4/2015 | Herberger et al. |
| 9,026,446 B2 | 5/2015 | Fiumi |
| 9,032,297 B2 | 5/2015 | Lovejoy et al. |
| 9,032,298 B2 | 5/2015 | Segal et al. |
| 2001/0041050 A1 | 11/2001 | Iwata et al. |
| 2002/0083324 A1 | 6/2002 | Hirai |
| 2002/0091835 A1 | 7/2002 | Lentini et al. |
| 2002/0116716 A1 | 8/2002 | Sideman |
| 2002/0144130 A1 | 10/2002 | Rosner et al. |
| 2002/0181732 A1 | 12/2002 | Safavi-Naini et al. |
| 2002/0181738 A1 | 12/2002 | Nakamura et al. |
| 2003/0233462 A1 | 12/2003 | Chien |
| 2004/0078825 A1 | 4/2004 | Murphy |
| 2004/0223606 A1 | 11/2004 | Enete |
| 2005/0289068 A1 | 12/2005 | Stefik et al. |
| 2006/0251383 A1 | 11/2006 | Vronay et al. |
| 2006/0259589 A1 | 11/2006 | Lerman et al. |
| 2007/0106419 A1 | 5/2007 | Rachamadugu |
| 2007/0107032 A1 | 5/2007 | Rachamadugu |
| 2007/0162855 A1 | 7/2007 | Hawk et al. |
| 2007/0179979 A1* | 8/2007 | Folgner .................. G06F 16/51 |
| 2007/0198363 A1 | 8/2007 | Quoc et al. |
| 2007/0198534 A1 | 8/2007 | Hon et al. |
| 2007/0208442 A1 | 9/2007 | Perrone |
| 2007/0250901 A1 | 10/2007 | McIntire et al. |
| 2007/0277108 A1 | 11/2007 | Orgill et al. |
| 2007/0300158 A1 | 12/2007 | Kasperkiewicz et al. |
| 2008/0049971 A1 | 2/2008 | Ramos et al. |
| 2008/0065771 A1 | 3/2008 | Marvit et al. |
| 2008/0112683 A1 | 5/2008 | Lin et al. |
| 2008/0123976 A1 | 5/2008 | Coombs et al. |
| 2008/0140433 A1 | 6/2008 | Levy et al. |
| 2008/0155614 A1 | 6/2008 | Cooper et al. |
| 2008/0165388 A1 | 7/2008 | Serlet |
| 2008/0183608 A1 | 7/2008 | Gavin et al. |
| 2008/0183844 A1 | 7/2008 | Gavin et al. |
| 2008/0193100 A1 | 8/2008 | Baum et al. |
| 2008/0208692 A1 | 8/2008 | Garaventi et al. |
| 2008/0243727 A1 | 10/2008 | Weber et al. |
| 2008/0301228 A1 | 12/2008 | Flavin |
| 2009/0007267 A1 | 1/2009 | Hoffmann |
| 2009/0094147 A1 | 4/2009 | Fein et al. |
| 2009/0157608 A1 | 6/2009 | Strathearn et al. |
| 2009/0183081 A1 | 7/2009 | Rodriguez et al. |
| 2009/0196570 A1 | 8/2009 | Dudas et al. |
| 2009/0249244 A1 | 10/2009 | Robinson et al. |
| 2010/0004944 A1 | 1/2010 | Palaniappan |
| 2010/0077022 A1 | 3/2010 | Mikkelsen et al. |
| 2010/0083176 A1 | 4/2010 | Park |
| 2010/0169127 A1 | 7/2010 | Malackowski et al. |

(56) References Cited

U.S. PATENT DOCUMENTS

| | | |
|---|---|---|
| 2010/0169779 A1 | 7/2010 | Mason et al. |
| 2010/0192072 A1 | 7/2010 | Spataro et al. |
| 2010/0226525 A1 | 9/2010 | Levy et al. |
| 2010/0257457 A1 | 10/2010 | Goes |
| 2010/0260468 A1 | 10/2010 | Khatib et al. |
| 2010/0269048 A1 | 10/2010 | Pahlavan et al. |
| 2010/0285884 A1 | 11/2010 | Gauer, III et al. |
| 2010/0325153 A1 | 12/2010 | Thakkar et al. |
| 2011/0026898 A1 | 2/2011 | Lussier et al. |
| 2011/0026899 A1 | 2/2011 | Lussier et al. |
| 2011/0026900 A1* | 2/2011 | Lussier ............... G06F 3/04842 348/E7.003 |
| 2011/0029883 A1 | 2/2011 | Lussier et al. |
| 2011/0143631 A1 | 6/2011 | Lipman et al. |
| 2011/0167353 A1 | 7/2011 | Grosz et al. |
| 2011/0213655 A1 | 9/2011 | Henkin et al. |
| 2011/0214045 A1 | 9/2011 | Sumler et al. |
| 2011/0246554 A1 | 10/2011 | Bury et al. |
| 2011/0246892 A1 | 10/2011 | Hedges |
| 2011/0282727 A1 | 11/2011 | Phan et al. |
| 2011/0288910 A1 | 11/2011 | Garg et al. |
| 2011/0314390 A1 | 12/2011 | Park et al. |
| 2012/0033948 A1 | 2/2012 | Rodriguez et al. |
| 2012/0066059 A1 | 3/2012 | Berger |
| 2012/0079606 A1 | 3/2012 | Evans et al. |
| 2012/0130954 A1 | 5/2012 | Hood |
| 2012/0189282 A1 | 7/2012 | Wyatt et al. |
| 2012/0245952 A1 | 9/2012 | Halterman et al. |
| 2012/0251080 A1 | 10/2012 | Svendsen et al. |
| 2012/0251083 A1 | 10/2012 | Svendsen et al. |
| 2012/0254752 A1 | 10/2012 | Svendsen et al. |
| 2012/0254778 A1 | 10/2012 | Svendsen et al. |
| 2012/0263439 A1 | 10/2012 | Lassman et al. |
| 2012/0284176 A1 | 11/2012 | Svendsen et al. |
| 2012/0314025 A1 | 12/2012 | Fiumi |
| 2013/0007669 A1 | 1/2013 | Lu et al. |
| 2013/0064110 A1 | 3/2013 | Polinati et al. |
| 2013/0111326 A1 | 5/2013 | Lockhart et al. |
| 2013/0114847 A1 | 5/2013 | Petrovic et al. |
| 2013/0132462 A1 | 5/2013 | Moorer |
| 2013/0275886 A1 | 10/2013 | Haswell et al. |
| 2013/0311556 A1 | 11/2013 | Srivastava et al. |
| 2014/0047413 A1 | 2/2014 | Sheive et al. |
| 2014/0067950 A1 | 3/2014 | Winograd |
| 2014/0096020 A1 | 4/2014 | Grosz et al. |
| 2014/0121017 A1 | 5/2014 | Mandryk et al. |
| 2014/0143218 A1 | 5/2014 | Sanghavi et al. |
| 2014/0255009 A1 | 9/2014 | Svendsen et al. |
| 2014/0258101 A1 | 9/2014 | Svendsen et al. |
| 2014/0317506 A1 | 10/2014 | Rustberggaard et al. |
| 2014/0321832 A1 | 10/2014 | Shore |
| 2015/0050009 A1 | 2/2015 | Svendsen et al. |
| 2017/0131855 A1 | 5/2017 | Svendsen et al. |
| 2019/0325913 A1 | 10/2019 | Svendsen et al. |

OTHER PUBLICATIONS

Jokela, Tero et al., "Mobile Video Editor: Design and Evaluation," Proceedings of the 12th International Conference on Human-Computer Interaction: Interaction Platforms and Techniques, pp. 344-353 (Jul. 2007).

Video Toolbox.com, "Video Toolbox—advanced online video editor. Convert, crop, merge or record videos with just a few clicks," (2009) [retrieved from the Internet at http://www.videotoolbox.com/ on Apr. 10, 2014].

Kallinikos, Jannis et al., "Video as Digital Object: Production and Distribution of Video Content in the Internet Media Ecosystem," The Information Society: An International Journal, vol. 27, No. 5, pp. 281-294, Sep. 27, 2011.

Koh, Kyungwon, "Adolescents' Information-Creating Behavior Embedded in Digital Media Practice Using Scratch," Journal of the American Society for Information Science and Technology, vol. 64, Issue 9, pp. 1826-1841.

* cited by examiner

LOW BANDWIDTH CONSUMPTION ONLINE CONTENT EDITING

CROSS-REFERENCE TO RELATED APPLICATION

The present application is a continuation application of U.S. patent application Ser. No. 15/342,364, filed on Nov. 3, 2016, which is a continuation application of U.S. patent application Ser. No. 14/874,311, filed on Oct. 2, 2015, which is a continuation application of U.S. patent application Ser. No. 13/433,256, filed on Mar. 28, 2012, which claims benefit of U.S. Provisional Patent Application Nos. 61/468,725, filed on Mar. 29, 2011, 61/564,256 filed on Nov. 28, 2011, 61/564,257, filed on Nov. 28, 2011, and 61/564,261, filed on Nov. 28, 2011, all of which are incorporated herein by reference.

BACKGROUND

Generally, audio-video content editing on computer systems involves computationally intensive processes and utilizes larger than usual amounts of computing resources than other computer activities (e.g., word processing, browsing the Internet). This is particularly true when the content editing involves high definition/quality audio or video content, which are well notorious for being large in data size and process heavy during content encoding and decoding processes.

Unfortunately, due to these computing needs, high definition/quality audio-video content editing has typically been limited to powerful computing systems that tend to have the requisite computing resources to perform content editing quickly. If the same high definition/quality content editing were to be performed on a less powerful computing system, the likely result would be slower or poorer content editing performance, possibly to the point where the content editing becomes impractical or impossible. Consequently, less powerful computing systems, such as older computer systems, netbooks, and particular mobile devices, are either prevented from performing audio-video content editing, or relegated to performing audio-video content editing involving only proxy content.

The foregoing example of trends and issues is intended to be illustrative and not exclusive. Other limitations of the art will become apparent to those of skill in the relevant art upon a reading of the specification and a study of the drawings.

SUMMARY

According to various embodiments, systems and methods for low bandwidth consumption online content editing are provided, where user-created content comprising high definition/quality content (also referred to as "non-proxy content") is created or modified at an online content editing server according to the instruction from an online content editor client, and where a proxy version (also referred to herein as a "proxy version") of the resulting user-created content is provided to online content editor client to facilitate review or further editing of the user-created content from the online content editor client. In some embodiments, the online content editing server utilizes proxy content (also referred to herein as "proxy content") during creation and modification operations on the user-created content, and replaces such proxy content with corresponding higher definition/quality content possibly when the user-created content is published for consumption, or when the user has paid for the higher quality content.

By utilizing proxy versions of the user-created content in this manner, systems and methods of some embodiments can utilize less network bandwidth as the online content editor client commands the online content editor server to perform content-related operations on user-created content, and as the online content editor server provides proxy versions of the user-created content for content review and editing purposes. The use of proxy versions of the user-created content also allow the online content editor client to review and edit content without the need for additional computing resources to review user-created content comprising high quality/high definition content.

In addition to using proxy versions of content for online content editing, various embodiments may optimize network bandwidth usage by dynamically determining what portions and/or versions of user-created or user-modified content should be uploaded from an online content editor client to an online content editing server as the content editing activities are performed (e.g., through the online content editor client). For some embodiments, the determination can be based on the type of content editing activity being performed at the online content editor client (e.g., collaborative content activity, previewing user-created content, or previewing rendered user-created content).

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
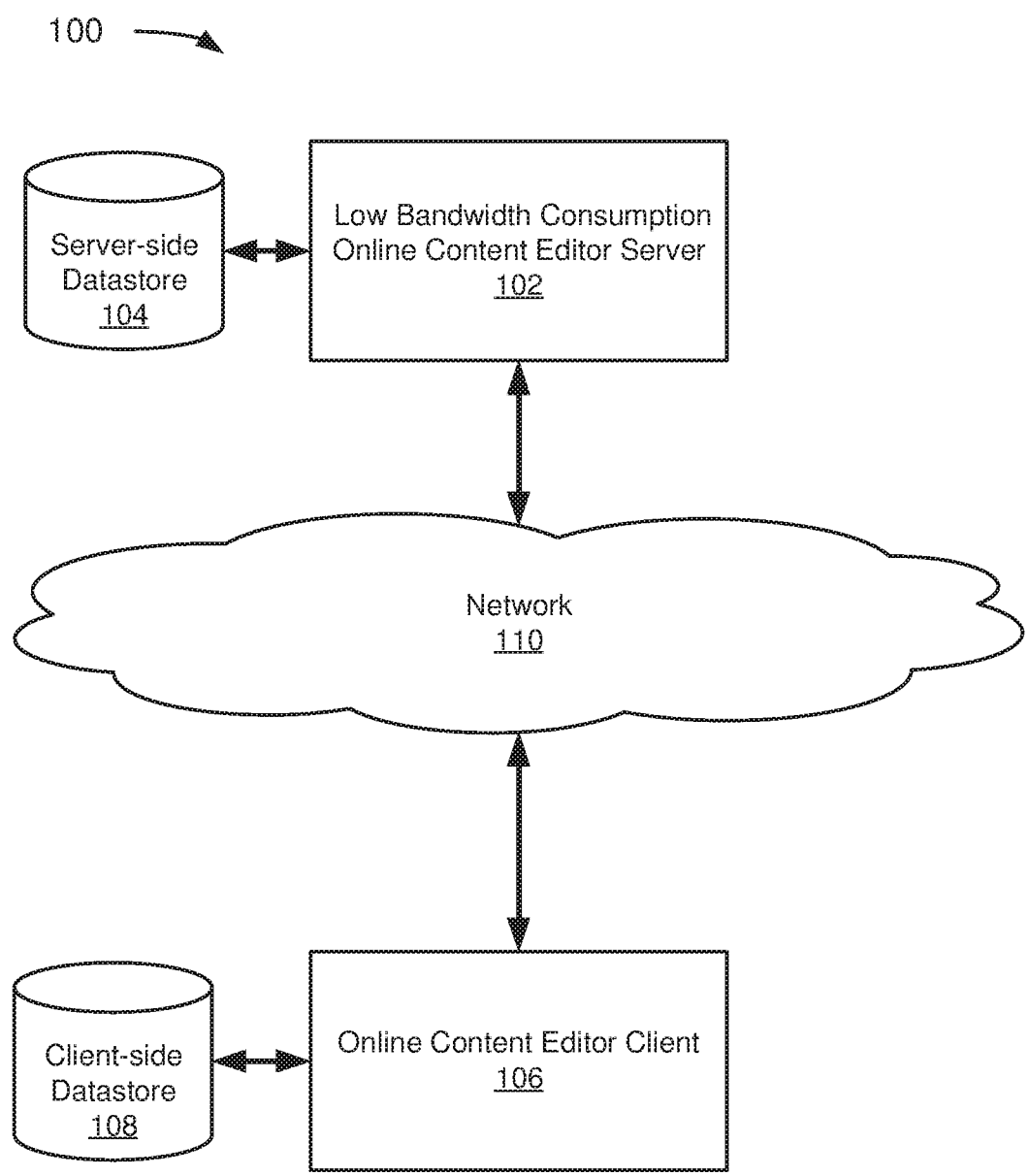
FIG. 1 depicts a diagram of an example of a low bandwidth consumption online content editor system in accordance with some embodiments.

FIG. 1 depicts a diagram of an example of a low bandwidth consumption online content editor system in accordance with some embodiments. The low bandwidth consumption online content editor system 100 includes a low bandwidth consumption online content editor server 102, a server-side datastore 104 coupled to the low bandwidth consumption online content editor server 102, an online content editor client 106, a client-side datastore 108 coupled to the online content editor client 106, and a network 110 through which the online content editor client 106 communicates with the low bandwidth consumption online content editor server 102. Through this arrangement, the online content editor client 106 can leverage the computing resources and power of the low bandwidth consumption online content editor server 102 when creating or modifying user-created content, especially when the user-created content comprises high definition/quality graphics, image, audio, or video content. Often, the low bandwidth consumption online content editor server 202 comprises computing resources that surpass those of the online content editor client 206, or computing resources that are better suited for content creation or modification than those of the online content editor client 206. Though FIG. 1 depicts a single online content editor client, the system 100 can include multiple online content editor clients that can communicate with the low bandwidth consumption online content editor server 102.

"User-created content" as used herein includes any content authored by a user using the content creation/editing tools described in this paper, or some other content editing tool. The user-created content can be created to be multi-layered content, comprising multiple content layers of different content types. High definition/quality as used herein includes content having definition or quality that is higher than the average definition or quality for the similar content. For example, high definition/quality audio content can include audio clips having a high sampling rate (e.g., 44 KHz), has a higher bit-rate or effective bit-rate (e.g., 256 Kbs), or is encoded in a lossless audio encoding format.

As used in this paper, an engine includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

In the example of FIG. 1, the low bandwidth consumption online content editor system 100 can enable a user at the online content editor client 106 located remotely on the network 110 to instruct the low bandwidth consumption online content editor server 102 to create or modify user-created content on behalf of the client 106, where the created or modified user-created content comprises high definition/quality content or a proxy version thereof. The user-created content may be multi-layered content comprising a plurality of content layers, where each content layer comprises one or more content items from a content library, and the content items are high definition/quality content items or versions thereof.

As the low bandwidth consumption online content editor server 102 creates or modifies the user-created content, the server 102 provides the online content editor client 106 a version of the resulting user-created content that comprises a proxy version of the high definition/quality content. The online content editor client 106 can use the resulting user-created content (having proxy content) for review or editing purposes as the client 106 instructs the server 102 to modify the user-created content. For example, the online content editor client 106 can perform edits to content by directly applying edits to the proxy content (e.g., received from the server 102) and then uploading the edited proxy content to the server 102 (e.g., so that the server 102 has latest version of the content for collaboration or final rendering/publishing purposes). In another example, the online content editor client 106 can perform edits to content by instructing the server 102 to perform edits to the content (e.g., stored at the server 102) on the client 106's behalf; thereafter, the online content editor client 106 can receive a proxy version of the content resulting from the edits applied by the server 102.

By transmitting user-created content comprising proxy content (i.e., lower quality version of the user-created content), the low bandwidth consumption online content editor server 102 utilizes less network bandwidth when transmitting the user-created content to the online content editor client 106. Additionally, the lower quality version of the content is received by the online content editor client 106 requires less computing resources to play and view. For some embodiments, utilization of the network bandwidth (for example, when transmitting user-created content or other information between the low bandwidth consumption online content editor server 102 and the online content editor client 106) can be further optimized using one or more methods described in association with FIG. 5.

Depending on the embodiment, the low bandwidth consumption online content editor server 102 can provide a proxy version of user-created content as a content stream that buffers and plays at the online content editor client 106, or as a content file that is playable at the online content editor client 106 once the content file has been downloaded to the client 106 or while the content file is being downloaded by the client 106.

In some embodiments, the low bandwidth consumption online content editor server 102 can create or modify the user-created content using a proxy version of the high definition/quality content, and then provide the resulting user-created content (comprising the proxy version) to the online content editor client 106. In various embodiments, the low bandwidth consumption online content editor server 102 can create or modify the user-created content using the high definition/quality content, generate a version of the user-created content comprising a proxy content, and then provide the resulting the proxy user-created content to the online content editor client 106.

As the low bandwidth consumption online content editor server 102 creates and modifies the user-created content, one or more versions of the user-created content may be stored on the server-side datastore 104. The server 102 can store created or modified user-created content before the created or modified user-created content to the online content editor client 106. When the online content editor client 106 receives created or modified user-created content, the client 106 can store the created or modified user-created content on the client-side datastore 108 before the created or modified user-created content is reviewed or previewed at the client 106.

A datastore can be implemented, for example, as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

Eventually, at the instruction of the online content editor client 106, the low bandwidth consumption online content editor server 102 can publish a finalized version of the user-created content for download or sharing with others. During publication, the low bandwidth consumption online content editor server 102 can replace low definition/quality content in the user-created content with a high-quality definition/high quality counterpart or some version thereof. For some embodiments, the low bandwidth consumption online content editor server 102 will replace low definition/quality content with corresponding high-quality definition/high quality content based on payment by a user. For example, a user may have to make payment before the user-created content is published with high definition/quality content. Absent payment, the user can be prevented from publishing the user-created content, or the user is left with publishing user-created content using proxy content.

Figure 2:
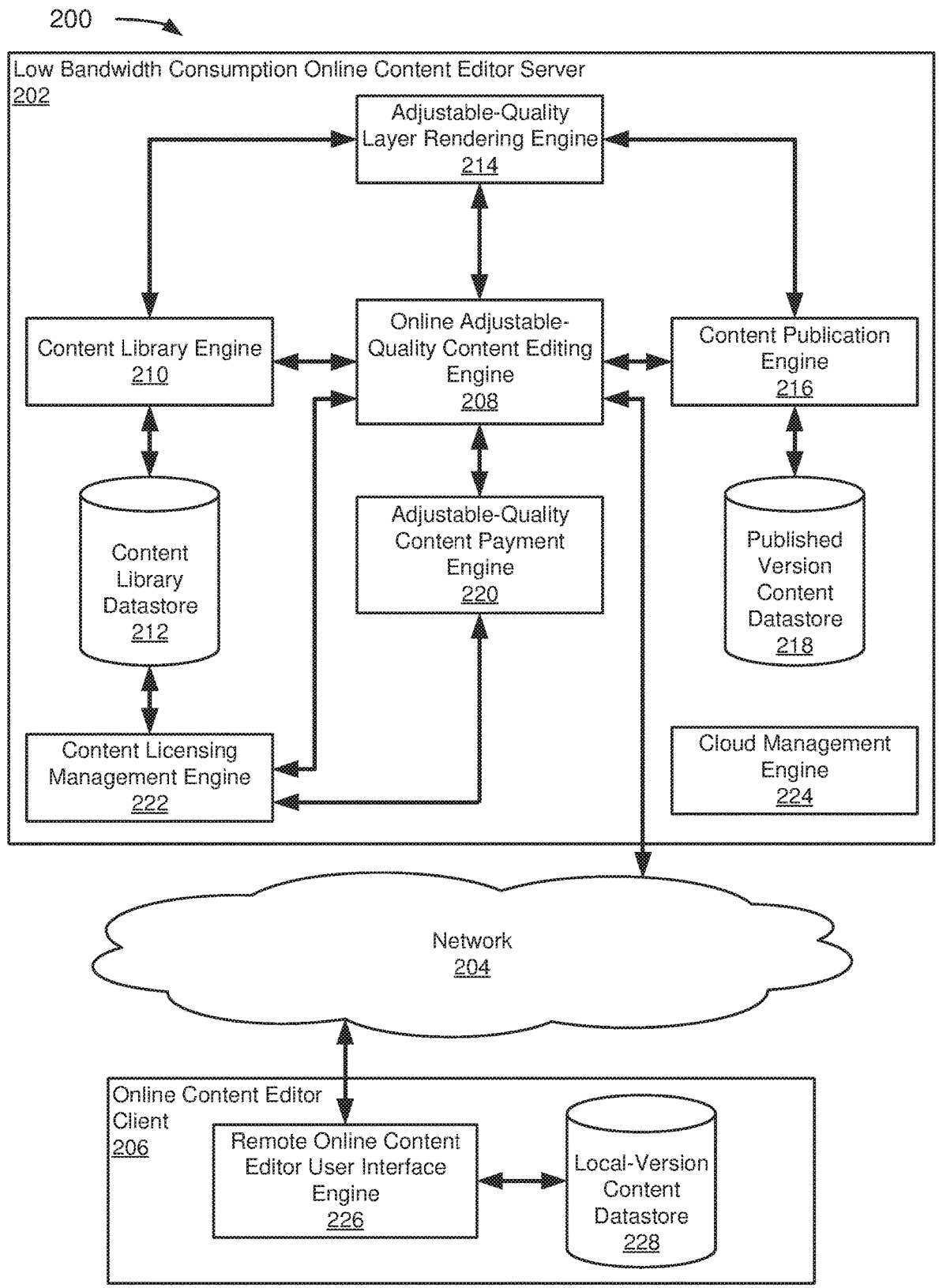
FIG. 2 depicts a diagram of an example of a client-server system for low bandwidth consumption online content editing in accordance with some embodiments.

FIG. 2 depicts a diagram of an example of a system for low bandwidth consumption online content editing in accordance with some embodiments. The system 200 for low bandwidth consumption online content editing includes a low bandwidth consumption online content editor server 202, an online content editor client 206, and a network 204 facilitating communication between the server 202 and the client 206. As described herein, the system 200 can enable a user at the online content editor client 206 located remotely on the network 204 to instruct the low bandwidth consumption online content editor server 202 to create or modify user-created content comprising high definition/quality content (or some quality variant thereof) at the server. As later discussed, for some embodiments, the online content editor client 206 can instruct the low bandwidth consumption online content editor server 202 through a remote online content editor user interface engine 226 located at the client 206. Subsequently, the low bandwidth consumption online content editor server 202 can provide, and the online content editor client 206 can receive, a version of the created or modified user-created content having a proxy version of the high definition/quality content.

In the example of FIG. 2, the low bandwidth consumption online content editor server 202 comprises an online adjustable-quality content editing engine 208, a content library engine 210, a content library data store 212, an adjustable-quality layer rendering engine 214, a content publication engine 216, a published version content datastore 218, and an adjustable-quality content payment engine 220. The low bandwidth consumption online content editor server 202 further comprises a content licensing management engine 222 and a cloud management engine 224.

In the example of FIG. 2, the online adjustable-quality content editing engine 208 creates or modifies user-created content at the low bandwidth consumption online content editor server 202 on behalf of the online content editor client 206. In certain embodiments, the online adjustable-quality content editing engine 208 can establish a connection with the online content editor client 206 over the network 204, can receive commands relating to content creation or modification over a network connection, can perform content creation or modification operations in accordance with commands received from the online content editor client 206, and can transmit to the online content editor client 206 a version of the created or modified user-created content comprising a proxy version of the high definition/quality content. As noted herein, the created or modified user-created content may be multi-layered content comprising one or more content layers, each content layer comprising one or more content items from a content library. The content items utilized can be high definition/quality content items or proxy versions thereof.

In order to perform various operations, the online adjustable-quality content editing engine 208 is coupled to the content library engine 210, the adjustable-quality layer rendering engine 214, the content publication engine 216, and the adjustable-quality content payment engine 220. As discussed in detail below, the adjustable-quality content quality editing engine 208 can access content items and information relating to the content items through the content library engine 210, can render one or more (content) layers of the user-created content at an adjusted quality using the adjustable-quality layer rendering engine 214, and can use the content publication engine 216 to publish the user-created content at an adjusted quality for download or sharing purposes. The online adjustable-quality content editing engine 208 can receive pre-payment or post-payment through the adjustable-quality content payment engine 220 to permit access to for-purchase content or to publish the user-defined content using for-purchase content (e.g., content of varying quality, such as high definition/quality content).

In the example of FIG. 2, the content library engine 210 is coupled to the content library datastore 212 and manages the content items stored therein. For some embodiments, the content library engine 210 can be responsible for adding, deleting and modifying content items stored on the content library datastore 212, for retrieving a listing of content items stored on the content library datastore 212, for providing details regarding content items stored on the content library datastore 212, and for providing to other engines content items from the content library. For example, the content library engine 210 can provide content items to the online adjustable-quality content editing engine 208 as a user reviews and select content items to be added to the user-created content. In another example, the content library engine 210 can provide content items to the adjustable-quality layer rendering engine 214 as the engine 214 renders one or more layers of user-created content.

In the example of FIG. 2, the content library datastore 212 stores content items that can be used in the user-created content. The content items of the content library datastore 212 can include, without limitation, audio content, video content, image content, graphics contents, and user-provided content. In some embodiments, the user-provided content can include the user-created content that was created or modified using the low bandwidth consumption online content editor server 202 and subsequently added to the content library datastore 212, and user content uploaded from the online content editor client 206 to the low bandwidth consumption online content editor server 202. The content items of the content library datastore 212 can also include, without limitation, free content that can be used in user-created content without need of payment, for-purchase content that can be reviewed only after user payment, content that can be added to user-created content only after user payment, and content that can be used in the publication of user-created content only after user payment.

In some embodiments, the high definition/quality content items can be added to, removed from, and adjusted within the user-created item without need of payment. When the user requests publication of the user-created content, the low bandwidth consumption online content editor server 202 can request payment before publication of the user-created content is allowed. Alternatively, a payment can be requested in order for the user-created content to be published using the high definition/quality content rather a proxy version of the high definition/quality content.

In some embodiments, the low bandwidth consumption online content editor server 202 can use proxy versions of the high definition/quality content when performing creation and modification operations on the user-created content, where the use of the proxy version continues until publication of the user-created content. In some embodiments, the content library engine 210 can provide the server 202 with the proxy version of the high definition/quality content utilized during creation and modification operations. Depending on the embodiment, the content library engine 210 can generate the proxy version as it is requested by various engines (e.g., the adjustable-quality layer rendering engine 214, or the online adjustable-quality content editing engine 208), or the content library engine 210 can provide the proxy version as stored on the content library datastore 212. As described herein, the proxy version of the high definition/quality content can also be utilized by the online adjustable-quality content editing engine 208 when transmitting previews of the content to the online content editor client 206.

The content stored on the content library datastore 212 (hereafter, also referred to as "content items") can have various associated properties (i.e., content item properties) that provide details regarding aspects of the content items. In certain embodiments, the content item properties can comprise such information as content type, content duration, content usage permissions (e.g., licensing rights), content cost parameters (e.g., free to use until the user-created content is published, or is published using high definition/quality content), content data size, content source (e.g., user provided, or third party author), or content creation or modification date. Through online adjustable-quality content editing engine 208, a user can review listings of content items in the content library datastore 212 (e.g., available or unavailable content), review details regarding content items in the content library (e.g., price, usage parameters, content type, duration where applicable, or content definition/quality), manage content items in the content library datastore 212 (e.g., add, delete, or modify content items in the content library), and add content items from the content library datastore 212 to user-created content.

In the example of FIG. 2, the adjustable-quality layer rendering engine 214 renders one or more layers of the user-created content using content items provided by the content library engine 210 from the content library datastore 212. The content items provided to the adjustable-quality layer rendering engine 214 can be high definition/quality content or a lesser definition/quality version of the same. As the adjustable-quality layer rendering engine 214 renders layers of the user-created content, the online adjustable-quality content editing engine 208 can specify to the adjustable-quality layer rendering engine 214 the desired quality/definition for the resulting layers.

For instance, the online adjustable-quality content editing engine 208 can specify that the layers of the user-created content, comprising high definition/quality content, be rendered using a low definition/quality version of the high definition/quality content. Thereafter, the user-created content comprising layers of low definition/quality content can be provided to the online content editor client 206 by the online adjustable-quality content editing engine 208 for preview or editing purposes, or can be provided to the content publication engine 216 (e.g., for free publication of user-created content comprising proxy content). In some embodiments, the online adjustable-quality content editing engine 208 can specify that the layers of the user-created content, comprising high definition/quality content, be rendered using the high definition/quality content, but only at the time of publication through the content publication engine 216, or only at after the user submits payment through the adjustable-quality content payment engine 220.

In the example of FIG. 2, the content publication engine 216 receives user-created content rendered by the adjustable-quality layer rendering engine 214 and publishes the user-created content. The user-created content can be published such that the user-created content can be downloaded and saved by the user or others as a stand-alone content file (e.g., MPEG or AVI file), or such that user-created content can be shared to other over the network (e.g., posted to a website so that others can play/view the user-created content). Once published, the user-created content can be stored on the published version content datastore 218. For some embodiments, the published user-created content can be added to the content library datastore 212 for reuse in other user-created content. Depending on the embodiment, the published user-created content can be added to the content library datastore 212 as for-purchase content (for example with the sales proceeds being split between amongst the user and the online content editor service provider), or added to the content library datastore 212 as free content available to the public. The user can also define content usage parameters (i.e., licensing rights) for their user-created content when the user-created content is added to the content library datastore 212.

In the example of FIG. 2, the adjustable-quality content payment engine 220 facilitates user payment to the low bandwidth consumption online content editor server 202, and can determine the level of functionality provided by the low bandwidth consumption online content editor server 202, or the level of definition/quality for content within the user-created content. For example, once payment has been received by the adjustable-quality content payment engine 220 and the adjustable-quality content payment engine 220 has informed the online adjustable-quality content editing engine 208 of such payment, the online adjustable-quality content editing engine 208 can allow the user to access certain content items in the content library datastore 212 (e.g., for-purchase content), can allow the user to perform certain content creation or modification operations (e.g., splitting a content layer), or can allow the user to publish the user-created content with high definition/quality content. In some embodiments, the definition/quality of the content within the user-created content may variable and determined based on the amount payment made by the user. The adjustable-quality content payment engine 220 can maintain an account, where the user can maintain a positive balance from which funds are deducted as payments are made to the low bandwidth consumption online content editor server 202, or where charges are incurred to the account and the user submits payment some time after (e.g., a credit system). In various embodiments, the online adjustable-quality content editing engine 208 can inform the adjustable-quality content payment engine 220 of the costs accrued by the user as he or she uses content items from the content library datastore 212 in the user-created content, or as certain functionality of the online adjustable-quality content editing engine 208 is utilized. As noted herein, the pricing for content items can be stored with the content items in the content library datastore 212.

In the example of FIG. 2, the content licensing management engine 222 can determine the licensing rights and permissions of content items stored on the content library datastore 212, and inform the online adjustable-quality content editing engine 208 of such rights and permissions. The online adjustable-quality content editing engine 208, in turn, can adapt control its own functionality in accordance with the licensing rights and permissions of the content item as the content item is utilized in the user-created content. For instance, where the content licensing rights and permissions of a certain content item restricted the content item from being split during creation or modification of the user-created content (i.e., the content item has to remain intact in the user-created content), the online adjustable-quality content editing engine 208 can automatically disable a split content layer command with respect to that certain content item. Other content licensing rights and permissions can include publication limitations on the user-created content, or limitations on use of content items based on the existing content of the user-created content. The content licensing management engine 222 cam inform the online adjustable-quality content editing engine 208 of the cost of certain content items based on their use in accordance with the licensing rights and permissions. For some embodiments, the authors of the content items can configure the licensing rights and permissions for their content items, which is then stored on the content library datastore 212.

In some embodiments, where the low bandwidth consumption online content editor server 202 is implemented using virtual or cloud-based computing resources, such virtual or cloud-based computer resources can be managed through the cloud management engine 224. The cloud management engine 224 can delegate various content-related operations and sub-operations of the server 202 to virtual or cloud-based computer resources, and manage the execution of the operations. Depending on the embodiment, the cloud management engine 224 can facilitate management of the virtual or cloud-based computer resources through a application program interface (API) that provides management access and control to the virtual or cloud-based infrastructure providing the computing resources for the low bandwidth consumption online content editor server 202.

In the example of FIG. 2, the online content editor client 206 comprises a remote online content editor user interface engine 226 and a local-version content datastore 228 coupled to the remote online content editor user interface engine 226. The remote online content editor user interface engine 226 facilitates the creation or modification of user-created content at the low bandwidth consumption online content editor server 202 by the online content editor client 206. As noted herein, the remote online content editor user interface engine 226 can establish a connection with the online adjustable-quality content editing engine 208 over the network 204, and then issue content creation and modification commands to the online adjustable-quality content editing engine 208. In accordance with the issued commands, the online adjustable-quality content editing engine 208 can perform the content creation or modification operations at the low bandwidth consumption online content editor server 202, and can return to the remote online content editor user interface engine 226 a proxy version of the resulting user-created content.

Alternatively, the online content editor client 206 can modify content by receiving a proxy version of content to be edited, apply edits directly to the proxy content, and then upload the edited proxy content to the low bandwidth consumption online content editor server 202 so that the edits can be consistently applied to corresponding content residing on the server 202. For some embodiments, the edited proxy content can be sent to the online adjustable-quality content editing engine 208 for application to the corresponding content residing on the server 202. Additionally, when the edited lower quality/definition content is uploaded from the online content editor client 206 to the low bandwidth consumption online content editor server 202, various implementations can utilize one or more methods for optimizing the network bandwidth usage. More regarding such optimization methods are described herein in association with FIG. 5.

Depending on the embodiment, the low bandwidth consumption online content editor server 202 can provide the proxy version of user-created content as a content stream that is buffered and played through the remote online content editor user interface engine 226, or as a content file that is playable by the remote online content editor user interface engine 226 once the content file has been downloaded to the online content editor client 206 and stored to the local-version content datastore 228.

Figure 3:
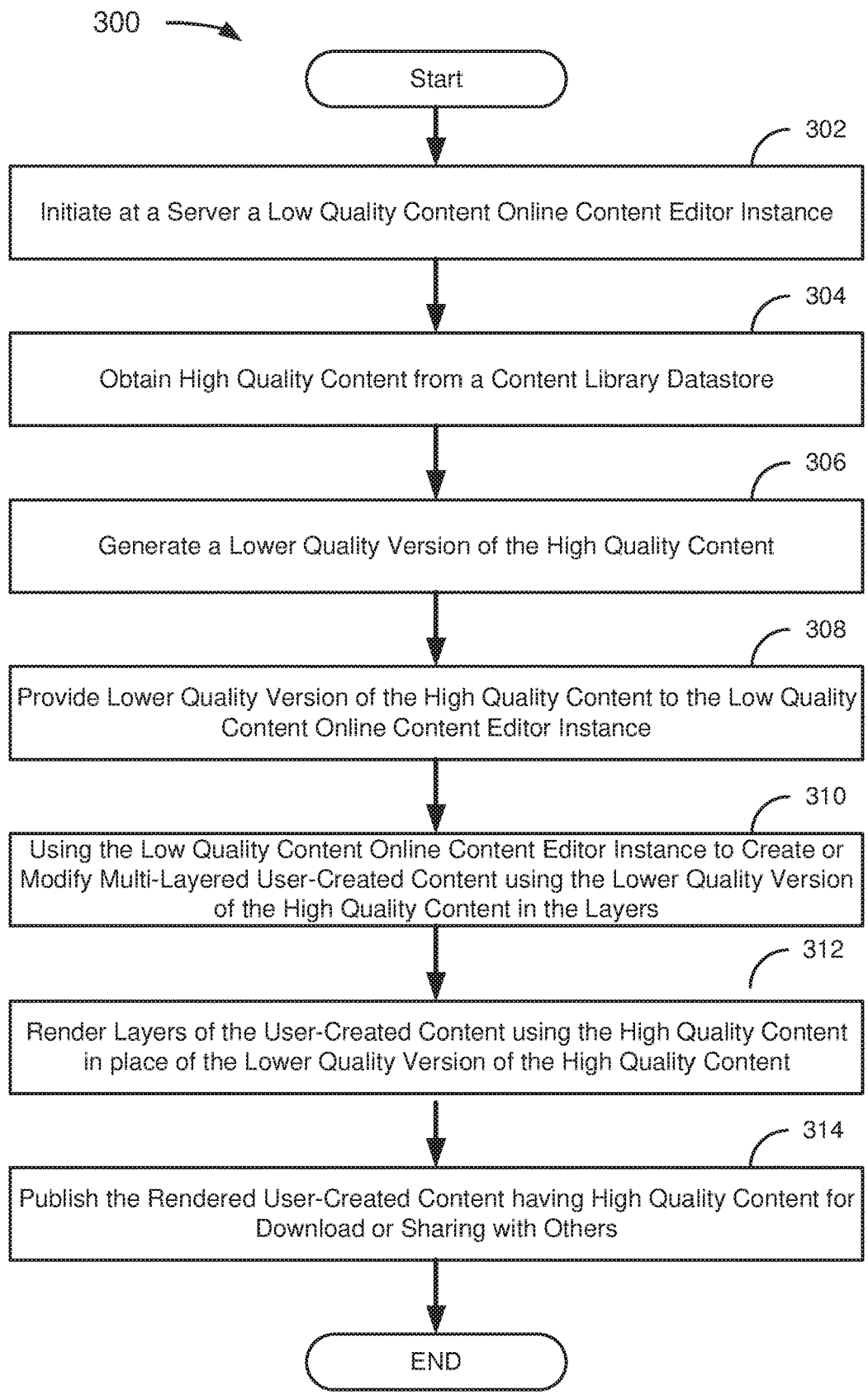
FIG. 3 depicts a flowchart of an example of a server-side method for low bandwidth consumption online content editing in accordance with some embodiments.

FIG. 3 depicts a flowchart of an example of a server-side method for low bandwidth consumption online content editing in accordance with some embodiments. In some implementations, the modules of the flowchart 300 and other flowcharts described in this paper are reordered to a permutation of the illustrated order of modules or reorganized for parallel execution. In the example of FIG. 3, the flowchart 300 starts at module 302 with initiating a low quality content online content editor instance at a server. Once initiated, the low quality content online content editor instance can perform content creation or modification operations on multi-layered user-created content at the server. The server can be implemented on a conventional computing device, preferably a server-class computing device, or a virtual computing or cloud-based server.

In the example of FIG. 3, the flowchart 300 continues to module 304 with obtaining high quality content from a content library datastore. The content library datastore is remotely located with respect to the client and can reside at the server (or, alternatively, remotely located to the server as well). In addition to high quality content, the content library datastore can comprise content of varying quality or definition. Module 306 can obtain the high quality content from the content library datastore when the user interface instructs the low quality content online content editor instance to utilize the high quality content in the multi-layered user-created content.

In the example of FIG. 3, the flowchart 300 continues to module 306 with generating a lower quality version of the high quality content obtained during module 304. The generation of the lower quality version of the high quality content can be in anticipation of providing the lower quality version to the lower quality content online content editor instance for use in the multi-layered user-created content.

In the example of FIG. 3, the flowchart 300 continues to module 308 with providing of the lower quality version of the high quality content to the lower quality content online content editor instance.

In the example of FIG. 3, the flowchart 300 continues to module 310 with creating or modifying of multi-layered user-created content using the lower quality version of the high quality content, where the lower quality version is used in a first layer of the multi-layered user-created content. As noted herein, the lower quality content online content editor instance can perform the creation or modification operations with respect to the multi-layered user created content. Through the use of the lower quality version of the multi-layered user-created content, less bandwidth is consumed over the connection between the server and the client as the client performs content editing at the server and the server provides the lower quality version to the client (e.g., for reviewing and editing purposes). Furthermore, the lower quality version of the multi-layered user-created content requires less computing resources at the client when multi-layered user-created content is played or viewed at the client (e.g., for reviewing or editing purposes).

In the example of FIG. 3, the flowchart 300 continues to module 312 with rendering of the first layer of the multi-layered user-created content, where the high quality content replaces the lower quality version of the high quality content in the first layer. In some embodiments, the replacement of the lower quality version of the high quality content can occur only after the user has made a payment for the high quality content, or only when the multi-layered user-created content is to be published for download or sharing purposes.

In the example of FIG. 3, the flowchart 300 ends at module 314 with publishing the resulting multi-layered user-created content for consumption by others or by the user (e.g., via download), where the multi-layered user-created content comprises the rendered first layer having the high quality content.

Figure 4:
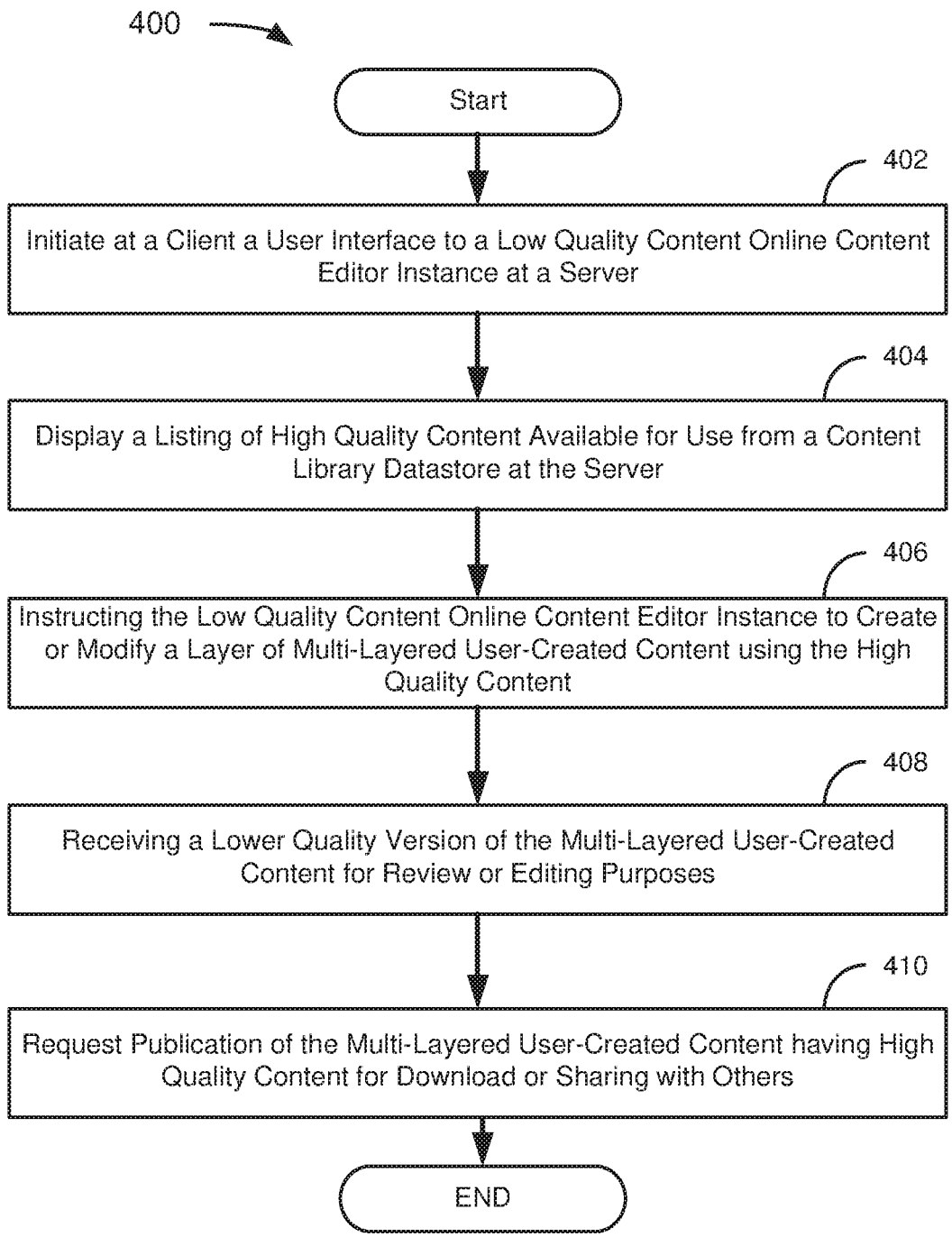
FIG. 4 depicts a flowchart of an example of a client-side method for low bandwidth consumption online content editing in accordance with some embodiments.

FIG. 4 depicts a flowchart of an example of a client-side method for low bandwidth consumption online content editing in accordance with some embodiments. In some implementations, the modules of the flowchart 400 and other flowcharts described in this paper are reordered to a permutation of the illustrated order of modules or reorganized for parallel execution. In the example of FIG. 4, the flowchart 400 starts at module 402 with initiating a user interface at a client to a lower quality content online content editor instance at a server. Once initiated, a user at the client can issue commands, such as content creation or modification commands, to the low quality content online content editor instance at the server through the user interface. In response, the low quality content online content editor instance can perform operations on the multi-layered user-created content residing at the server, where the operations are in accordance with the content creation or modification commands issued. The client can be implemented by any known or convenient computing device including, for example, mobile computing devices, netbooks, and desktop. Generally, the server possesses computing resources in excess of those of the client, or the server possesses computing resources better suited for content creation or modification than those of the client.

In the example of FIG. 4, the flowchart 400 continues to module 404 with displaying a listing of high quality content available for use in a layer of multi-layered user-created content, where the high quality content is from a content library datastore at the server. The server can query the content library datastore for high quality content, and the query result can be provided to the client through the user interface as a listing of the high quality content available for use. As noted herein, the high quality content listed can include available content that is free to be used during creation or modification operations on the multi-layered user-created content, but that requires payment for the multi-layered user-created content to be published with the high quality content rather than a lower quality version of the same, or that requires a payment before the multi-layered user-created content can be published at all. In some embodiments, as the high quality content is used without payment during creation or modification operations, a lower quality version of the high quality content can be used in place of the high quality content for such operations, thereby obviating the need for generating a lower quality version of the multi-layered user-created content before it is provided to the user interface at the client for review and editing purposes.

In the example of FIG. 4, the flowchart 400 continues to module 406 with instructing the lower quality content online content editor instance at the server to create or modify a layer of the multi-layered user-created content using the high quality content. The high quality content can be selected from one or more items provided in the list of module 404. As noted herein, the client can instruct the lower quality content online content editor instance through the user interface, and the lower quality content online content editor instance in response can act upon such instructions.

In the example of FIG. 4, the flowchart 400 continues to module 408 with receiving a lower quality version of the multi-layered user-created content that results from module 406, where the lower quality version is received at the client for review or editing purposes. As noted herein, the client can receive the lower quality version through the user interface, which can play or view the lower version for the user at the client. Depending on the embodiment, the client can receive the lower quality version for reviewing the results of the content creation or modification operations performed by the server on the multi-layered user-created content. The lower quality version can also be received for instructing the lower quality content online content editor instance to perform additional content creation or modification operations to the multi-layered user-created content. Through the use of the lower quality version of the multi-layered user-created content, less bandwidth is consumed over the connection between the server and the client as the client performs content editing at the server. Additionally, the lower quality version of the multi-layered user-created content requires less computing resources at the client when multi-layered user-created content is played or viewed at the client (e.g., for reviewing or editing purposes).

In the example of FIG. 4, the flowchart 400 continues to module 410 with requesting the publication of the multi-layered user-created content having high quality content for the purposes of download or sharing with others. As described herein, the client can make a request for publication through the user interface at the client. When the client requests publication of the multi-layered user-created content, the lower quality content used in the multi-layered user-created content can be replaced with corresponding high quality content, and published for access by the users or others.

Figure 5:
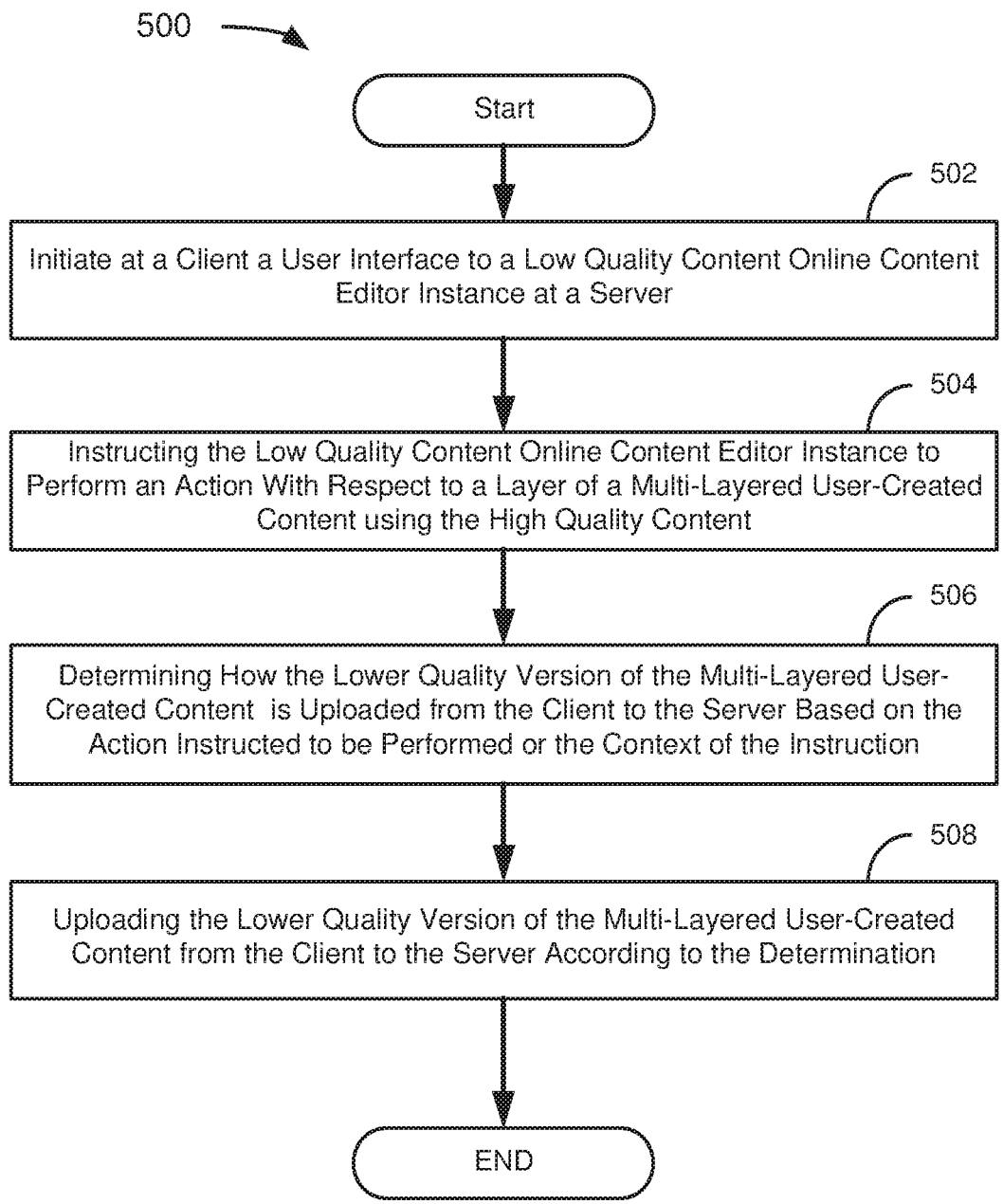
FIG. 5 depicts a flowchart of an example of an optimization method for low bandwidth consumption online content editing in accordance with some embodiments.

FIG. 5 depicts a flowchart of an example of an optimization method for low bandwidth consumption online content editing in accordance with some embodiments. Use of the optimization method can, for some embodiments, allow for efficient use of network bandwidth between an online low-bandwidth consumption client and an online low-bandwidth consumption server. Depending on the embodiment, the optimization method can be implemented at the online low-bandwidth consumption client, at an online low-bandwidth consumption server, or both. Once implemented, the optimization method can determine how and when a content transfer between the online low-bandwidth consumption client and the online low-bandwidth consumption server can be performed in a manner which reduces the amount of content data being transferred. Generally, the optimization method makes the transfer determination based on the type of content creation or modification being performed, based on the context in which the content creation or modification is being performed, preferences set at the online low-bandwidth consumption client or the online low-bandwidth consumption server, or some combination thereof.

Those skilled in the art will appreciate that depending on the implementation, the optimization method can be implemented for content transfer from the online low-bandwidth consumption client to the online low-bandwidth consumption server, can be implemented for content transfer from the online low-bandwidth consumption server to the online low-bandwidth consumption client, or both. Additionally, though the optimization methods described herein are primarily described in association with content transfers, those skilled in the art will appreciate that the optimization methods can be utilized for other information being transferred between the online low-bandwidth consumption client and the online low-bandwidth consumption server including, for example, timeline information. Furthermore, in some implementations, the modules of the flowchart 500 and other flowcharts described in this paper are reordered to a permutation of the illustrated order of modules or reorganized for parallel execution.

In the example of FIG. 5, the flowchart 500 starts at module 502 with initiating a user interface at a client to a lower quality content online content editor instance at a server. Once initiated, a user at the client can issue commands, such as content creation or modification commands, to the low quality content online content editor instance at the server through the user interface. In response, the low quality content online content editor instance can perform operations on the multi-layered user-created content residing at the server or the multi-layered user-created content residing at the client, where the operations are in accordance with the content creation or modification commands issued. As noted herein, the client can be implemented by any known or convenient computing device including, for example, mobile computing devices, netbooks, and desktop. Generally, the server possesses computing resources in excess of those of the client, or the server possesses computing resources better suited for content creation or modification than those of the client.

In the example of FIG. 5, the flowchart 500 continues to module 504 with instructing the low quality content online content editor instance to perform an action with respect to a layer of a multi-layered user-created content, which is using high quality content. The high quality content can be selected from one or more items from a content library datastore at the server. As noted herein, the client can instruct the lower quality content online content editor instance through the user interface, and the lower quality content online content editor instance in response can act upon such instructions. As also noted herein, the high quality content listed can include available content that is free to be used during creation or modification operations on the multi-layered user-created content, but that requires payment for the multi-layered user-created content to be published with the high quality content rather than a lower quality version of the same, or that requires a payment before the multi-layered user-created content can be published at all. In some embodiments, as the high quality content is used without payment during creation or modification operations, a lower quality version of the high quality content can be used in place of the high quality content for such operations, thereby obviating the need for generating a lower quality version of the multi-layered user-created content before it is provided to the user interface at the client for review and editing purposes.

At module 504, actions instructed to be performed may include creation operations or edit operations to be performed on the user-created content. The context in which the instruction is made and/or the action is performed can have an influence on how the method optimizes transfers of content between the client and server. Some examples of context aspects that can be considered during the optimization method include whether the instruction is requested in a collaborative setting (e.g., were one content editor user are editing the same user-created content in a collaborative manner), content editor user preferences (e.g., early start on rendering processes), and whether one or more other instructions have been requested concurrently with the instruction requested at module 504.

In the example of FIG. 5, the flowchart 500 continues to module 506 with determining how the low quality version of the multi-layered user-created content is uploaded from the client to the server based on the action instructed to be performed (at module 504) or the context in which the instruction was made (at module 504). For example, where a content editor user is performing content edits to user-created content residing locally at the content editor user's client, the module 506 can determine that only those portions of user-created content that are affected by the content editor user's modifications are transferred from the client to the server. In another example, where a content editor user has instructed two or more content modification actions be performed on the user-created content, the module 506 can determine that the user-created data should be transferred only once the two or more modification actions have been performed, as to avoid having to transfer the user-created content after each action is performed.

In yet another example, where two or more content editor users are collaboratively performing content edits to the same user-created content and where each content editor user is respectively editing proxy content residing locally at the content editor user's client, the module 506 can determine portions of the proxy content residing at the respective clients are uploaded to the server as early as possible as the portions are modified by the individual content editor users. In doing so, various implementation can try to ensure that the latest changes applied by individual collaborative users to the user-created content can be shared amongst other collaborative users.

In a further example, where a content editor user indicates a preference (e.g., through user settings) for server processes (e.g., rendering or conversion) to be performed on content as early as possible (e.g., as content data begins to arrive at the server from the client), the module 506 can determine that any upload of proxy or non-proxy content from the client to the server should be transferred in parts (e.g., content data chunks or segments), thereby enabling the server to commence processing of the content as the parts are received (rather than waiting for the content in its entirety).

Where the module 506 determines proxy or non-proxy content should be uploaded from the client to the server in parts, and where the server is processing those parts as they are being received, a content editor user can suspend or cancel the server processing mid-performance through the client, during which the content editor user can further modify portions of the content through the client. The portions modified during the suspension or cancellation of server processed may correspond to parts of the content that were already processed by the server before suspension or cancellation of the server processing was issued. In some implementations, the portions of the content that have already been processed by the server but are not subsequently modified by the content editor user may be reutilized to avoid unnecessary processing. Also, where the module 506 determines proxy or non-proxy content should be uploaded from the client to the server in parts, and where the server is processing those parts as they are being received, the client may begin to receive a preview of those portions already processed before all the portions have been processed by the server.

For some implementations, the determination performed by the module 506 may be based on preferences set by a content editor user at an online content editor client or preferences set by an administrator at an online content editor server. In some implementations, the online content editor client and/or the online content editor server can be configured to perform the determination of module 506 according to a preconfigured setting.

In the example of FIG. 5, the flowchart 500 continues to module 508 with uploading the lower quality version of the multi-layered user-created content from the client to the server according to the determination made in module 506. As noted herein, the determination can include uploading the lower quality version of the multi-layered user-created content in parts, uploading the lower quality version of the multi-layered user-created content according to what portions of the user-create content have been modified at the client, or uploading modified portions of the lower quality version of the multi-layered user-created content as early as possible (e.g., when in a collaborative online content editing setting).

Figure 6:
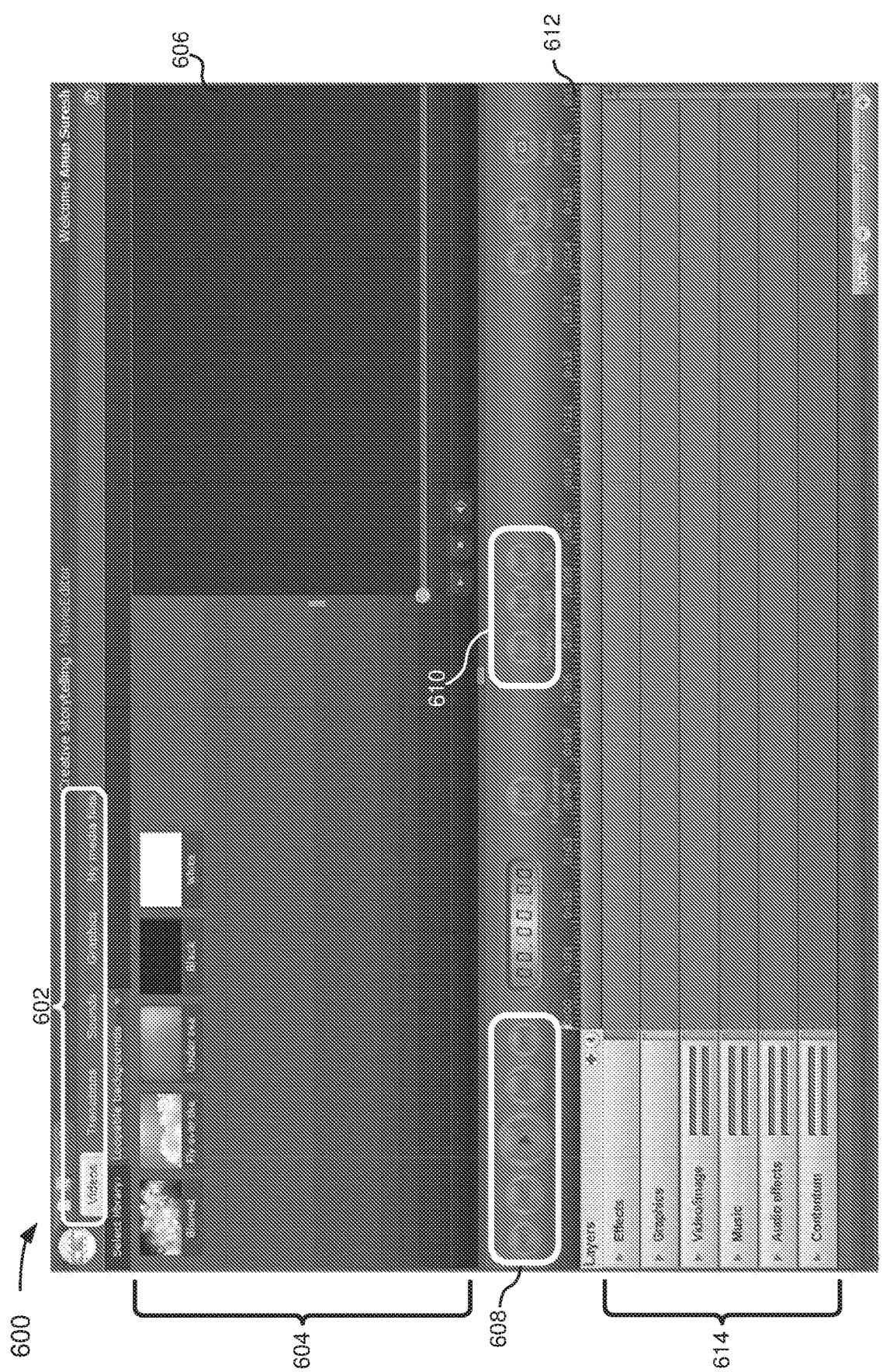
FIG. 6 depicts an example of client-side user interface for low bandwidth consumption online content editing in accordance with some embodiments.

FIG. 6 depicts an example of client-side user interface for low bandwidth consumption online content editing in accordance with some embodiments. Through the client-side user interface, a user at a client can perform online content editing at a server while consuming low bandwidth over a network connection. In particular, the client-side user interface can be used at the client to create or edit user-created content residing at the server. The client-side user interface can be transferred from a server to a client as a module that can then be operated on the client. For example, the client-side user interface can comprise a client-side applet or script that is downloaded to the client from the server and then operated at the client (e.g., through a web browser). Additionally, the client-side user interface can operate through a plug-in that is installed in a web browser. User input to the client-side user interface can cause a command relating to online content editing, such as a content layer edit command or a content player/viewer command, to be transmitted from the client to the server.

The client-side user interface 600 includes multiple controls and other features that enable a user at a client to control the creation or modification of content at a server. In the example of FIG. 6, the client-side user interface 600 includes a tabbed menu bar 602, a content listing 604, a content player/viewer 606, content player/viewer controls 608, content layer editor controls 610, a content timeline indicator 612, and a content layering interface 614.

In the example of FIG. 6, the client-side user interface 600 includes the tabbed menu bar 602 that allows the user to select between different content types (e.g., video, audio, or images) as they search for content available to them from a content library. Here, the tabbed menu bar 602 allows the user to select between reviewing "Videos," "Sounds," "Graphics" (e.g., text or images), or personal (media) content (i.e., "My media files") that is available from the content library. The personal content can be that which the user uploaded to their account on the server, that which the user already created on the server, or both. Those of ordinary skill in the art would appreciate that in some embodiments, the tabbed menu bar 602 can include additional content types (e.g., "3D Video") from which the user can select as they search for content available to them from the content library.

The tabbed menu bar 602 also enables the user to select "Transitions," which can be predefined or user-created content transitions inserted between two content items in a layer of user-created content. For instance, with respect to video content (i.e., video clips), available transitions can include a left-to-right video transition which once inserted between a first video clip and a second video clip, cause the first video clip transition to the second video clip in a left-to-right manner. Likewise, with respect to audio content (i.e., audio clips), available transitions can include a right-to-left transition which once inserted between a first audio clip and a second audio clip, causes the first audio clip to fade into to the second audio clip starting from the right audio channel and ending at the left audio channel.

As the user selects between the content types in the tabbed menu bar 602, a listing of available content matching the selected content type can be displayed to the user accordingly. In the example of FIG. 6, the content listing 604 displays a list of content available from the content library. For some embodiments, the content listing 604 can list the available content with a thumbnail image configured to provide the user with a preview of the content. For example, for video content, the thumbnail image may be a moving image that provided a brief preview of the video content. With respect to image content, the thumbnail preview may be a smaller sized version (i.e., lower resolution version) of the image content. In certain embodiments, a content item listed in content listing 604 can be further previewed in a content player/viewer 606, configured to play audio or video or display larger resolution images. The content listing 604 can also provide details regarding the listed content including, without limitation, a source of the content, a date of creation for the content, a data size of the content, a time duration of the content (where applicable), licensing information relating to the content, and cost of using the content.

In the example of FIG. 6, a user can utilize the player/viewer 606 to preview content items from the content library listed in the content listing 604. The content player/viewer 606 can also provide a preview of user-created content being created through the client-side user interface 600. In one example, the user can create user-created content, containing one or more video and audio content items from the content library, and then preview that user-created content through the content player/viewer 606. Depending on the embodiment, as the user-created content is previewed through the content player/viewer 606, the server can stream such user-created content to the client as it is being played or shown. In some embodiments, the user-created content can be first downloaded to the client before it is played or shown through the content player/viewer 606.

As described herein, the content library items or the user-created content shown through the content player/viewer 606 can be of a proxy than the actual definition/quality of the content residing on the server or the content that is eventually rendered by the server. Because the proxy content requires less bandwidth when being transferred from the server to a client, some embodiments can lower the data bandwidth consumption between the client and server as content is created, edited, and previewed through the client-side user interface 600.

In the example of FIG. 6, a user controls the operations of the content player/viewer 606 using the content player/viewer controls 608. The content player/viewer controls 608 can include control commands common to various players, such as previous track, next track, fast-backward, fast-forward, play, pause, and stop. For some embodiments, a user input to the content player/viewer controls 608 can result in a content player/viewer command instruction being transmitted from the client to the server.

In the example of FIG. 6, the content layer editor control 610 comprises controls that enable the user to edit content layers of user-created content. Through the content layer editor control 610, a user can implement edits to a content layer of the user-created content residing on the server. The content layer editor control 610 can include edit controls that enable a user to add, delete or modify one or more content layers of user-created content. Example edit controls include, without limitation, adding a content layer, deleting a content layer, splitting a single content layer into two or more content layers, and editing properties of a content layer.

In the example of FIG. 6, the content timeline indicator 612 visually assists a user in determining a temporal position of a content layer in user-created content or a content item in the content layer. For instance, the content timeline indicator 612 can comprise a time marker that indicates a temporal start point or a temporal end point for a content layer or a content item in the content layer. In some embodiments, the length of the content timeline indicator 612 can adapt according to the overall duration of the user-created creation, or can be adjusted according to a user-setting.

In the example of FIG. 6, the content layering interface 614 enables a user to access and modify content layers of the user-created content. The content layering interface 614 can comprise a stack of content layer slots, where each content layer slot graphically presents all the content layers of a particular content type associated to the user-created content. Example content types include, without limitation, graphical content (e.g., "Graphics"), video content (e.g., "Video"), image content (e.g., "Image"), and audio content (e.g., "Audio effects"). The content layering interface 614 can also comprise image, video or audio effects, which can be applied to the various content types.

In some embodiments, the user can add content to a new or existing content layer of the user-created content by "dragging-and-dropping" content items from the content listing 604 into the content layering interface 614. Further, in various embodiments, the user can graphically modify a temporal position or duration of a content layer or a content item within the content layer. For instance, the user can drag-and-drop the graphically represented start or end of a content item to adjust the duration of the content item (thereby the temporal start of temporal end of the content item) in the user-created content.

Figure 7:
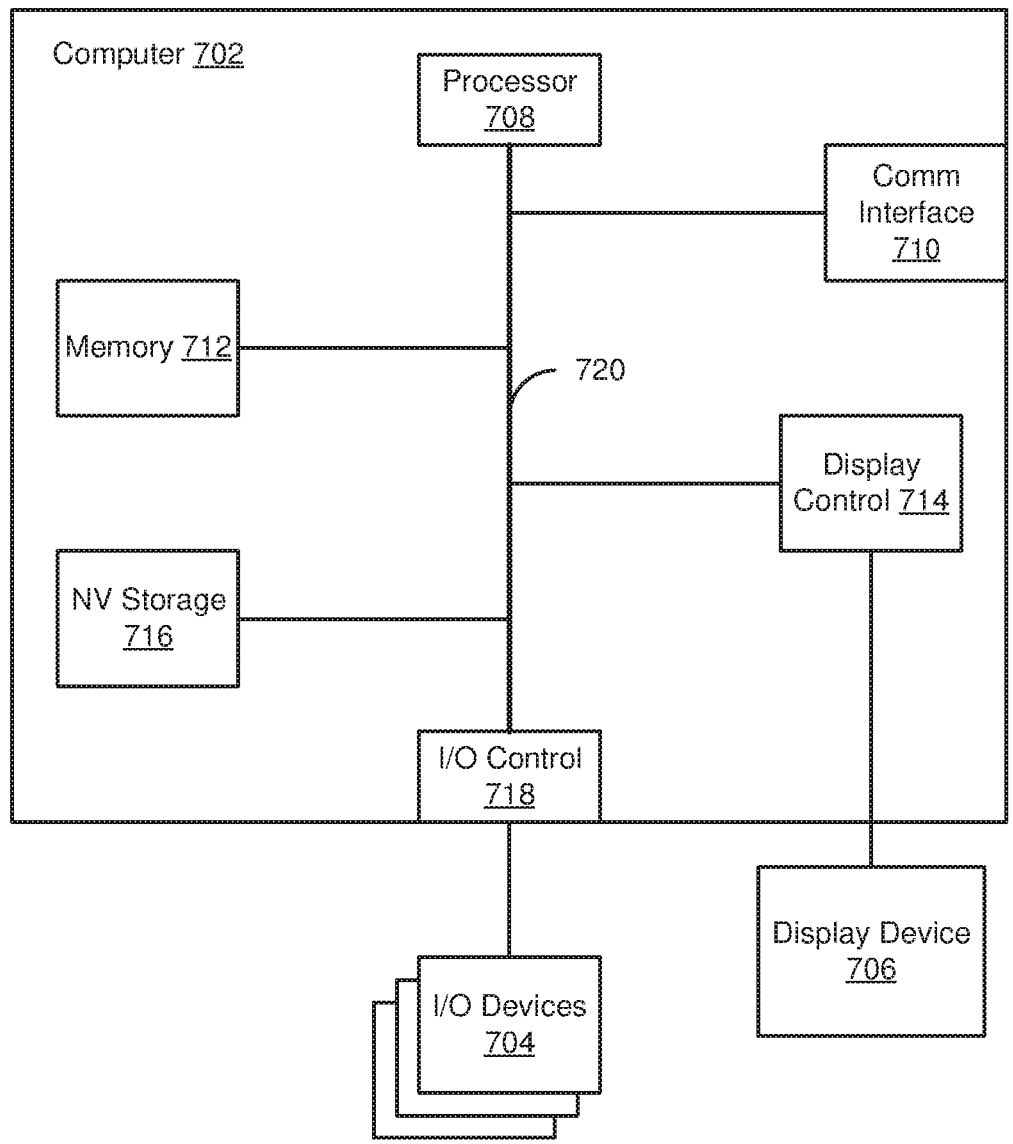
FIG. 7 depicts an example of a system on which techniques described in this paper can be implemented.

FIG. 7 depicts an example of a system on which techniques described in this paper can be implemented. The computer system 700 may be a conventional computer system that can be used as a client computer system, such as a wireless client or a workstation, or a server computer system. The computer system 700 includes a computer 702, I/O devices 704, and a display device 706. The computer 702 includes a processor 708, a communications interface 710, memory 712, display controller 714, non-volatile storage 716, and I/O controller 718. The computer 702 may be coupled to or include the I/O devices 704 and display device 706.

The computer 702 interfaces to external systems through the communications interface 710, which may include a modem or network interface. It will be appreciated that the communications interface 710 can be considered to be part of the computer system 700 or a part of the computer 702. The communications interface 710 can be an analog modem, ISDN modem, cable modem, token ring interface, satellite transmission interface (e.g. "direct PC"), or other interfaces for coupling a computer system to other computer systems.

The processor 708 may be, for example, a conventional microprocessor such as an Intel Pentium microprocessor or Motorola power PC microprocessor. The memory 712 is coupled to the processor 708 by a bus 720. The memory 712 can be Dynamic Random Access Memory (DRAM) and can also include Static RAM (SRAM). The bus 720 couples the processor 708 to the memory 712, also to the non-volatile storage 716, to the display controller 714, and to the I/O controller 718.

The I/O devices 704 can include a keyboard, disk drives, printers, a scanner, and other input and output devices, including a mouse or other pointing device. The display controller 714 may control in the conventional manner a display on the display device 706, which can be, for example, a cathode ray tube (CRT) or liquid crystal display (LCD). The display controller 714 and the I/O controller 718 can be implemented with conventional well known technology.

The non-volatile storage 716 is often a magnetic hard disk, an optical disk, or another form of storage for large amounts of data. Some of this data is often written, by a direct memory access process, into memory 712 during execution of software in the computer 702. One of skill in the art will immediately recognize that the terms "machine-readable medium" or "computer-readable medium" includes any type of storage device that is accessible by the processor 708 and also encompasses a carrier wave that encodes a data signal.

The computer system 700 is one example of many possible computer systems which have different architectures. For example, personal computers based on an Intel microprocessor often have multiple buses, one of which can be an I/O bus for the peripherals and one that directly connects the processor 708 and the memory 712 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 712 for execution by the processor 708. A Web TV system, which is known in the art, is also considered to be a computer system, but it may lack some of the features shown in FIG. 7, such as certain input or output devices. A typical computer system will usually include at least a processor, memory, and a bus coupling the memory to the processor.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program may be stored in a computer readable storage medium, such as, but not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

Although the foregoing embodiments have been described in some detail for purposes of clarity of understanding, the invention is not necessarily limited to the details provided.

What is claimed is:

1. A system comprising:
   one or more processors; and
   memory storing instructions that, when executed by the one or more processors, cause the system to perform:
   obtaining access to first content, the first content containing a first representation of user-generated media and the first representation having a first quality;
   obtaining second content containing a second representation of user-generated media, the second representation having a second quality less than the first quality;
   determining how and when local edits are transferred, the how and when the local edits are transferred comprising transferring at least a portion of the local edits during local editing and prior to completion of the local editing, based on a context in which the local edits are performed and a characteristic of the local edits, the characteristic of the local edits comprising content editor user preferences indicated by a content editor user, wherein:
   if local edits to the second content modify only a portion of the second content, transferring, during the local editing, only the modified portion of the second content;
   rendering multi-layered user-created content by superimposing edit components of the local edits over the first content, the multi-layered user-created content having the first quality.

2. The system of claim 1, wherein a timing of the transfer of the local edits after two or more modification actions have been performed is determined based on one or more of type of editing instructions being input by the single user and a context in which the editing instructions are being input by the single user.

3. The system of claim 1, wherein a timing of the transfer of the local edits after two or more modification actions have been performed is periodic.

4. The system of claim 1, wherein the first representation of the user-generated media comprises one of a plurality of content layers, and the second representation of the user-generated media comprises a corresponding one of the plurality of content layers.

5. The system of claim 1, wherein the first content comprises one or more of an image, an audio clip, a video clip, and a transition sequence.

6. The system of claim 1, wherein the first content comprises payment-free content, for-purchase content, or a combination thereof.

7. The system of claim 1, wherein one or more client devices for performing the local edits comprise one or more of a mobile phone, a tablet, a laptop computer, and a desktop computer.

8. The system of claim 1, wherein the rendering is performed by a cloud-based system.

9. The system of claim 1, wherein the rendering the multi-layered user-created content at the first quality occurs after receiving payment from one or more users.

10. The system of claim 1, wherein the rendering the multi-layered user-created content at the first quality occurs when the multi-layered user-created content at the first quality is to be published for download or sharing.

11. A method comprising:
   obtaining access to first content, the first content containing a first representation of user-generated media and the first representation having a first quality;
   obtaining second content containing a second representation of user-generated media, the second representation having a second quality less than the first quality;
   determining how and when local edits are transferred, the how and when the local edits are transferred comprising transferring at least a portion of the local edits during local editing and prior to completion of the local editing, based on a context in which the local edits are performed and a characteristic of the local edits, the characteristic of the local edits comprising content editor user preferences indicated by a content editor user, wherein:
      if local edits to the second content modify only a portion of the second content, transferring, during the local editing, only the modified portion of the second content;
   rendering multi-layered user-created content by superimposing edit components of the local edits over the first content, the multi-layered user-created content having the first quality.

12. The method of claim 11, wherein a timing of the transfer of the local edits after two or more modification actions have been performed is determined based on one or more of type of editing instructions being input by the single user and a context in which the editing instructions are being input by the single user.

13. The method of claim 11, wherein a timing of the transfer of the local edits after two or more modification actions have been performed is periodic.

14. The method of claim 11, wherein the first representation of the user-generated media comprises one of a plurality of content layers, and the second representation of the user-generated media comprises a corresponding one of the plurality of content layers.

15. The method of claim 11, wherein the first content comprises one or more of an image, an audio clip, a video clip, and a transition sequence.

16. The method of claim 11, wherein the first content comprises payment-free content, for-purchase content, or a combination thereof.

17. The method of claim 11, wherein the rendering is cloud-based.

18. The method of claim 11, wherein the rendering the multi-layered user-created content at the first quality occurs after receiving payment from one or more users.

19. The method of claim 11, wherein the rendering the multi-layered user-created content at the first quality occurs when the multi-layered user-created content at the first quality is to be published for download or sharing.

* * * * *